US011897695B2

(12) United States Patent
Ma et al.

(10) Patent No.: US 11,897,695 B2
(45) Date of Patent: Feb. 13, 2024

(54) GOODS STORAGE AND DELIVERY CABINET, AND METHOD FOR COLLECTING AND DISTRIBUTING GOODS USING SAME

(71) Applicant: CAINIAO SMART LOGISTICS HOLDING LIMITED, Grand Cayman (KY)

(72) Inventors: Yung-Chen Ma, Hangzhou (CN); Hongliang Zhou, Hangzhou (CN); Wei Lyu, Hangzhou (CN)

(73) Assignee: CAINIAO SMART LOGISTICS HOLDING LIMITED, George Town (KY)

( * ) Notice: Subject to any disclaimer, the term of this patent is extended or adjusted under 35 U.S.C. 154(b) by 666 days.

(21) Appl. No.: 17/118,924

(22) Filed: Dec. 11, 2020

(65) Prior Publication Data

US 2021/0101746 A1    Apr. 8, 2021

Related U.S. Application Data

(63) Continuation of application No. PCT/CN2019/089558, filed on May 31, 2019.

(30) Foreign Application Priority Data

Jun. 13, 2018 (CN) .......................... 201810608995.8

(51) Int. Cl.
 *B65G 1/137* (2006.01)
 *A47F 1/04* (2006.01)
 (Continued)

(52) U.S. Cl.
 CPC ............... *B65G 1/137* (2013.01); *A47F 1/04* (2013.01); *A47F 3/14* (2013.01); *B65G 1/0435* (2013.01);
 (Continued)

(58) Field of Classification Search
 CPC ......... B65G 1/137; B65G 1/0435; A47F 1/04; A47F 3/14
 See application file for complete search history.

(56) References Cited

U.S. PATENT DOCUMENTS 6,694,217 B2 *   2/2004   Bloom .................... G07C 9/21
                                                    700/242
6,976,598 B2    12/2005   Engel
                           (Continued)

FOREIGN PATENT DOCUMENTS

CN          101057264 A        10/2007
CN          104134291 A        11/2014
                  (Continued)

OTHER PUBLICATIONS

First Search dated Jan. 28, 2021, issued in related Chinese Application No. 201810608995.8 (3 pages).
(Continued)

*Primary Examiner* — Kyle O Logan

(57) ABSTRACT

A cabinet for goods storage and access is provided, including: at least one fixed shelf configured to store goods; a moving member located on a side of the fixed shelf; a controller configured to control the moving member to move along the side of the fixed shelf to place goods in the fixed shelf or extract goods from the fixed shelf; a cabinet body surrounding the fixed shelf and the moving member, wherein a first slot is disposed on the cabinet body and adjacent to a moving track of the moving member, wherein the controller is configured to control the first slot to be opened or closed; and a volume recognizer disposed adjacent to the first slot to recognize a volume of goods entering the first slot.

20 Claims, 11 Drawing Sheets

(51) Int. Cl.
*A47F 3/14* (2006.01)
*B65G 1/04* (2006.01)
*G07F 17/12* (2006.01)

(52) U.S. Cl.
CPC ...... *G07F 17/12* (2013.01); *B65G 2203/0208* (2013.01); *B65G 2203/0258* (2013.01)

(56) References Cited

U.S. PATENT DOCUMENTS

| | | | |
|---|---|---|---|
| 7,159,415 | B2 | 1/2007 | Wood |
| 7,258,249 | B1 | 8/2007 | Frederick et al. |
| 8,060,247 | B2 | 11/2011 | Kaplan et al. |
| 8,145,351 | B2 | 3/2012 | Schininger et al. |
| 8,374,926 | B2 | 2/2013 | Solomon |
| 8,577,759 | B2 | 11/2013 | Solomon |
| 8,738,177 | B2 | 5/2014 | van Ooyen et al. |
| 8,857,930 | B2 | 10/2014 | Im et al. |
| 9,504,344 | B2 | 11/2016 | Sarvestani |
| 9,569,912 | B2 | 2/2017 | Faes |
| 9,865,003 | B2 | 1/2018 | Lowe |
| 9,920,981 | B2 | 3/2018 | Kim et al. |
| 9,980,564 | B2 | 5/2018 | Roberts et al. |
| 10,114,996 | B2* | 10/2018 | Lossov ............... G07F 17/0014 |
| 10,140,820 | B1 | 11/2018 | Zalewski et al. |
| 2008/0128444 | A1 | 6/2008 | Schininger et al. |
| 2013/0264381 | A1* | 10/2013 | Kim ................... G07F 17/13 232/24 |
| 2015/0073585 | A1 | 3/2015 | Este et al. |
| 2016/0253761 | A1 | 9/2016 | Davey et al. |
| 2017/0053099 | A1 | 2/2017 | Coughlin et al. |
| 2019/0251776 | A1 | 8/2019 | Adelberg et al. |
| 2021/0147146 | A1 | 5/2021 | Conrad et al. |

FOREIGN PATENT DOCUMENTS

| | | |
|---|---|---|
| CN | 204480392 U | 7/2015 |
| CN | 105139176 A | 12/2015 |
| CN | 105398728 A | 3/2016 |
| CN | 105747693 A | 7/2016 |
| CN | 205589846 U | 9/2016 |
| CN | 205692276 A | 11/2016 |
| CN | 106516524 A | 3/2017 |
| CN | 206766888 U | 12/2017 |
| CN | 107531411 A | 1/2018 |
| CN | 206849167 U | 1/2018 |
| CN | 107705456 A | 2/2018 |
| CN | 208538253 U | 2/2019 |
| JP | S60-250494 A | 12/1985 |
| JP | H03-46903 A | 2/1991 |
| JP | H09-216705 A | 8/1997 |
| JP | H09-240807 A | 9/1997 |
| JP | 2000-185806 A | 7/2000 |
| JP | 2004-242917 A | 9/2004 |
| KR | 10-2016-0026609 A | 3/2016 |
| WO | 00/30961 A1 | 6/2000 |

OTHER PUBLICATIONS

First Office Action dated Feb. 23, 2021, issued in related Chinese Application No. 201810608995.8, with English machine translation (29 pages).
Second Office Action dated Dec. 1, 2021, issued in related Chinese Application No. 201810608995.8, with English machine translation (31 pages).
PCT International Search Report and the Written Opinion dated Sep. 3, 2019, issued in related International Application No. PCT/CN2019/089558, with partial English translation (10 pages).
Extended European Search Report dated Mar. 28, 2022, issued in related European Patent Application No. 19818547.2 (10 pages).
Notice of Reasons for Refusal dated Mar. 22, 2022, issued in related Japanese Patent Application No. 2020-568798, with English machine translation (21 pages).
PCT International Preliminary Report on Patentability dated Dec. 24, 2020, issued in related International Application No. PCT/CN2019/089558, with English translation (12 pages).

* cited by examiner

US 11,897,695 B2

1

GOODS STORAGE AND DELIVERY CABINET, AND METHOD FOR COLLECTING AND DISTRIBUTING GOODS USING SAME

CROSS-REFERENCE TO RELATED APPLICATIONS

This application is a continuation application of International Patent Application No. PCT/CN2019/089558, filed on May 31, 2019, and entitled "GOODS STORAGE AND DELIVERY CABINET, AND METHOD FOR COLLECTING AND DISTRIBUTING GOODS USING SAME." The PCT application claims priority to and benefits of the Chinese Patent Application No. 201810608995.8, entitled "GOODS STORAGE AND DELIVERY CABINET, AND METHOD FOR COLLECTING AND DISTRIBUTING GOODS USING SAME," filed on Jun. 13, 2018, which is incorporated herein by reference in its entirety.

TECHNICAL FIELD

This application relates to intelligent devices in the field of logistics, and in particular, to a cabinet for goods storage and access and a method for collecting and distributing goods using the same.

BACKGROUND

Currently, the logistics and distribution industry develops very rapidly. Because the logistics and distribution industry is closely related to daily production and operation of enterprises and daily lives of people, the development of the logistics and distribution industry brings increasing convenience to enterprises and individuals. However, many parts in the field of logistics and distribution still have low efficiency, resulting in waste in costs such as labor, material resources, and time, etc.

In order to improve the efficiency of logistics and distribution and reduce labor costs, currently, logistics terminal self-pickup cabinets have emerged. The self-pickup cabinet has an input device and a plurality of storage compartments. A user may perform operations through the input device on the self-pickup cabinet to complete self-help package drop or fetching. Due to the emergence of logistics terminal self-pickup cabinets, logistics and distribution personnel only need to store goods in the cabinet and notify users to fetch the goods at a convenient time, so that the goods do not need to be distributed to a specific delivery address by the logistics and distribution personnel, avoiding waste of labor costs caused by a failure of finding the specific delivery address by the logistics and distribution personnel or a need to arrange delivery times with users in advance, etc.

However, the existing logistics terminal self-pickup cabinets are greatly limited by site conditions. Since positions and sizes of the storage compartments in the logistics terminal self-pickup cabinets are fixed, in order to store goods of different volumes, a number of storage compartments of various capacities need to be designed in advance. As a result, the logistics terminal self-pickup cabinets have a relatively large volume or occupy a relatively large floor space. Consequently, a location suitable for installing the logistics terminal self-pickup cabinet is greatly limited. In addition, these types of logistics terminal self-pickup cabinets have low space utilization, where storage compartments of a specific capacity are all occupied, while storage compartments of other capacities often cannot be used even when they are empty.

SUMMARY

This application provides a cabinet for goods storage and access, and a method for collecting and distributing goods using same.

According to a first aspect of this application, a cabinet for goods storage and access is provided, including:

at least one fixed shelf configured to store goods;

a moving member located on a side of the fixed shelf; and a controller configured to control the moving member to move along the side of the fixed shelf to a preset position on the fixed shelf, and control the moving member to place goods in the fixed shelf and/or extract the goods from the fixed shelf.

According to an embodiment, the at least one fixed shelf includes two fixed shelves with sides disposed opposite to each other, where the moving member is located between the two fixed shelves.

According to an embodiment, the fixed shelves completely or partially surround the moving member.

According to an embodiment, the at least one fixed shelf includes two fixed shelves disposed in an L shape, where the moving member moves along sides of the two fixed shelves under control of the controller.

According to an embodiment, each of the fixed shelves includes a plurality of columns of carrying parts, where each column of carrying parts have a plurality of supporting members distributed along a vertical direction, and the cabinet for goods storage and access further includes:

a plurality of carrying trays respectively supported by the plurality of supporting members.

According to an embodiment, the moving member includes a moving frame moving in a horizontal direction along the side of the fixed shelf under the control of the controller, to move to the side of a preset carrying part in the plurality of columns of carrying parts of the fixed shelf.

According to an embodiment, the moving member further includes a moving pallet moving in a vertical direction along the moving frame under the control of the controller, to move to the preset position on the fixed shelf.

According to an embodiment, the moving pallet has a horizontal conveyor configured to convey, under the control of the controller, a carrying tray located on a preset supporting member to the moving pallet along a horizontal direction and/or a carrying tray on the moving pallet to the preset supporting member along the horizontal direction.

According to an embodiment, the cabinet for goods storage and access further includes:

a cabinet body surrounding the fixed shelf and the moving member, where a first slot is disposed on the cabinet body, where the first slot is adjacent to a moving track of the moving member and is opened or closed under the control of the controller.

According to an embodiment, a height of the first slot corresponds to the middle of the moving member in the vertical direction.

According to an embodiment, a plurality second slots are further disposed on the cabinet body, where the plurality second slots are disposed adjacent to the fixed shelf.

According to an embodiment, the cabinet for goods storage and access further includes:

an information input apparatus configured to obtain information input by a user and send the information to the controller, where the controller is configured to:

record a correspondence between the information and goods, and control the moving member to convey, to a supporting member, a carrying tray carrying the goods corresponding to the information; and/or search for the goods corresponding to the information, and control the moving member to extract, from the fixed shelf, the carrying tray carrying the goods corresponding to the information.

According to an embodiment, the cabinet for goods storage and access further includes:

a scale disposed under the moving pallet to weigh goods placed on the moving pallet and send a weighing result to the controller; or a scale disposed under a carrying tray located at the first slot to weigh goods placed on the carrying tray and send a weighing result to the controller.

According to an embodiment, the cabinet for goods storage and access further includes:

a volume recognizer disposed adjacent to the first slot to recognize a volume of goods entering the first slot, where the controller is configured to control, according to a recognition result of the volume recognizer, the moving member to place the goods on the fixed shelf.

According to an embodiment, the controller is configured to select a shortest path according to the recognition result of the volume recognizer, and controls the moving member to place, the goods on the fixed shelf according to the shortest path.

According to an embodiment, the controller is configured to control, according to a volume of each piece of goods placed on the fixed shelf, the moving member to adjust a position of the each piece of goods on the fixed shelf.

According to an embodiment, the cabinet for goods storage and access further includes:

a live body detector disposed adjacent to the first slot to detect a live body entering the first slot and send a detection result to the controller.

According to an embodiment, the fixed shelf and the moving member are partially or completely buried underground or embedded in a wall.

According to a second aspect of this application, a method for collecting goods by using a cabinet for goods storage and access is provided, including:

opening, according to information provided by a user, a first slot disposed on a cabinet body of the cabinet for goods storage and access, and causing a moving member of the cabinet for goods storage and access adjacent to the first slot;

determining that the user places the goods on the moving member through the first slot;

controlling the moving member to move to a preset position on at least one fixed shelf of the cabinet for goods storage and access; and placing the goods at the preset position on the fixed shelf.

According to an embodiment, the at least one fixed shelf includes two fixed shelves with sides disposed opposite to each other, where the moving member is located between the two fixed shelves.

According to an embodiment, the at least one fixed shelf includes two fixed shelves disposed in an L shape, and the controlling the moving member to move to a preset position on at least one fixed shelf of the cabinet for goods storage and access includes:

controlling the moving member to move along sides of the two fixed shelves.

According to an embodiment, each of the fixed shelves includes a plurality of columns of carrying parts, where each column of carrying parts have a plurality of supporting members distributed along a vertical direction, the cabinet for goods storage and access further includes a plurality of carrying trays respectively supported by the plurality of supporting members, and the controlling the moving member to move to a preset position on at least one fixed shelf of the cabinet for goods storage and access includes:

controlling a moving frame of the moving member to move in a horizontal direction along the side of the fixed shelf to the side of a preset carrying part in the plurality of columns of carrying parts of the fixed shelf.

According to an embodiment, the controlling the moving member to move to a preset position on at least one fixed shelf of the cabinet for goods storage and access further includes:

controlling a moving pallet of the moving member to move in a vertical direction along the moving frame to the preset position on the fixed shelf.

According to an embodiment, the moving pallet has a horizontal conveyor; and the placing the goods at the preset position on the fixed shelf includes:

controlling the horizontal conveyor to convey, to a preset supporting member along a horizontal direction, a carrying tray on the moving pallet and the goods carried on the carrying tray.

According to an embodiment, a height of the first slot corresponds to the middle of the moving member in the vertical direction.

According to an embodiment, the method further includes:

recording a correspondence between the information provided by the user and the goods.

According to an embodiment, the method further includes:

weighing the goods.

According to an embodiment, the method further includes:

recognizing a volume of the goods; and determining, according to a recognized volume, a position at which the goods are to be placed.

According to an embodiment, the determining, according to a recognized volume, a position at which the goods are to be placed includes:

selecting a shortest path according to the recognized volume to determine the position at which the goods are to be placed on the fixed shelf.

According to an embodiment, the method further includes:

detecting a live body entering the first slot.

According to an embodiment, the cabinet for goods storage and access is partially or completely buried underground or embedded in a wall.

According to a third aspect of this application, a method for distributing goods from a cabinet for goods storage and access is provided, including:

determining a storage position at which goods corresponding to information provided by a user are placed on at least one fixed shelf of the cabinet for goods storage and access; and controlling a moving member of the cabinet for goods storage and access to move along a side of the fixed shelf to the storage position and to extract the goods from the storage position.

According to an embodiment, the at least one fixed shelf includes two fixed shelves with sides disposed opposite to each other, where the moving member is located between the two fixed shelves.

According to an embodiment, the at least one fixed shelf includes two fixed shelves disposed in an L shape, and the controlling a moving member of the cabinet for goods storage and access to move along a side of the fixed shelf to the storage position includes:

controlling the moving member to move along sides of the two fixed shelves.

According to an embodiment, each of the fixed shelves includes a plurality of columns of carrying parts, where each column of carrying parts have a plurality of supporting members distributed along a vertical direction, the cabinet for goods storage and access further includes a plurality of carrying trays respectively supported by the plurality of supporting members, and the controlling a moving member of the cabinet for goods storage and access to move along a side of the fixed shelf to the storage position includes:

controlling a moving frame of the moving member to move in a horizontal direction along the side of the fixed shelf to the side of a preset carrying part in the plurality of columns of carrying parts of the fixed shelf.

According to an embodiment, the controlling a moving member of the cabinet for goods storage and access to move along a side of the fixed shelf to the storage position further includes:

controlling a moving pallet of the moving member to move in a vertical direction along the moving frame to the storage position.

According to an embodiment, the moving pallet has a horizontal conveyor; and the controlling a moving member of the cabinet for goods storage and access to move along a side of the fixed shelf to the storage position and to extract the goods from the storage position further includes:

controlling the horizontal conveyor to convey a carrying tray on the supporting member at the storage position to the moving pallet along a horizontal direction.

According to an embodiment, a first slot is disposed on a cabinet body of the cabinet for goods storage and access, and the method further includes:

controlling the moving pallet to convey the extracted goods to the first slot.

According to an embodiment, a height of the first slot corresponds to the middle of the moving member in the vertical direction.

According to an embodiment, the cabinet for goods storage and access is partially or completely buried underground or embedded in a wall.

According to a fourth aspect of the application, a cabinet for goods storage and access is provided, including: at least one fixed shelf configured to store goods; a moving member located on a side of the fixed shelf; a controller configured to control the moving member to move along the side of the fixed shelf to place goods in the fixed shelf or extract goods from the fixed shelf; a cabinet body surrounding the fixed shelf and the moving member, wherein a first slot is disposed on the cabinet body and adjacent to a moving track of the moving member, wherein the controller is configured to control the first slot to be opened or closed; and a volume recognizer disposed adjacent to the first slot to recognize a volume of goods entering the first slot, wherein the controller is configured to control, according to the recognized volume, the moving member to move to a position on the at least one fixed shelf to place the goods on the fixed shelf, and wherein the controller is further configured to control, in response to the cabinet for goods storage and access being idle, the moving member to adjust a position of each piece of goods on the fixed shelf to maximize the space in the fixed shelf according to a volume of the each piece of goods placed on the fixed shelf.

In some embodiments, the at least one fixed shelf comprises two fixed shelves with sides disposed opposite to each other, wherein the moving member is located between the two fixed shelves.

In some embodiments, the fixed shelves completely or partially surround the moving member.

In some embodiments, the at least one fixed shelf comprises two fixed shelves disposed in an L shape, wherein the moving member moves along sides of the two fixed shelves under control of the controller.

In some embodiments, each of the at least one fixed shelf comprises a plurality of columns of carrying parts, wherein each column of carrying parts have a plurality of supporting members distributed along a vertical direction, and the cabinet for goods storage and access further comprises: a plurality of carrying trays respectively supported by the plurality of supporting members.

In some embodiments, the moving member comprises a moving frame moving in a horizontal direction along the side of the fixed shelf under the control of the controller, to move to the side of a preset carrying part in the plurality of columns of carrying parts of the fixed shelf.

In some embodiments, the moving member further comprises a moving pallet moving in a vertical direction along the moving frame under the control of the controller, to move to the position on the fixed shelf.

In some embodiments, the moving pallet has a horizontal conveyor configured to convey, under the control of the controller, a carrying tray located on a preset supporting member to the moving pallet along a horizontal direction or a carrying tray on the moving pallet to the preset supporting member along the horizontal direction.

In some embodiments, the cabinet for goods storage and access further comprises: an information input apparatus configured to obtain information input by a user and send the information to the controller, wherein the controller is further configured to: record a correspondence between the information and goods, and control the moving member to convey, to the supporting member, a carrying tray carrying the goods corresponding to the information; or search for the goods corresponding to the information, and control the moving member to extract, from the fixed shelf, the carrying tray carrying the goods corresponding to the information.

In some embodiments, a height of the first slot corresponds to the middle of the moving member in the vertical direction.

In some embodiments, a plurality second slots are further disposed on the cabinet body, wherein the plurality second slots are disposed adjacent to the fixed shelf.

In some embodiments, the cabinet for goods storage and access further comprises: a scale disposed under a moving pallet to weigh goods placed on the moving pallet and send a weighing result to the controller; or a scale disposed under a carrying tray located at the first slot to weigh goods placed on the carrying tray and send a weighing result to the controller.

In some embodiments, the controller is further configured to select a shortest path according to the recognition result of the volume recognizer, and control the moving member to place the goods on the fixed shelf according to the shortest path.

In some embodiments, the cabinet for goods storage and access further comprises: a live body detector disposed adjacent to the first slot to detect a live body entering the first slot and send a detection result to the controller.

In some embodiments, the fixed shelf and the moving member are partially or completely buried underground or embedded in a wall.

According to a fifth aspect of the application, a method is provided for collecting goods by using a cabinet for goods storage and access. The method includes: opening, according to information provided by a user, a first slot disposed on a cabinet body of the cabinet for goods storage and access, and causing a moving member of the cabinet for goods storage and access to be adjacent to the first slot for the user to place goods on the moving member through the first slot; recognizing a volume of the goods; determining, according to the recognized volume, a position at which the goods are to be placed on at least one fixed shelf of the cabinet for goods storage and access; controlling the moving member to move to the position on the at least one fixed shelf of the cabinet for goods storage and access to place the goods at the position on the fixed shelf; and in response to the cabinet for goods storage and access being idle, controlling, according to a volume of each piece of goods placed on the fixed shelf, the moving member to adjust a position of the each piece of goods on the fixed shelf to maximize the space in the fixed shelf.

According to a sixth aspect of the application, a controller for collecting goods from a user is provided. The controller is disposed in a cabinet for goods storage and access, and the controller includes: one or more processors and one or more non-transitory computer-readable memories coupled to the one or more processors and configured with instructions executable by the one or more processors to cause the controller to perform operations comprising: opening, according to information provided by a user, a first slot disposed on a cabinet body of the cabinet for goods storage and access, and causing a moving member of the cabinet for goods storage and access to be adjacent to the first slot for the user to place goods on the moving member through the first slot; receiving a volume of the goods recognized by a volume recognizer; determining, according to the volume, a position at which the goods are to be placed on at least one fixed shelf of the cabinet for goods storage and access; controlling the moving member to move to the position on the at least one fixed shelf of the cabinet for goods storage and access to place the goods at the position on the fixed shelf; and in response to the cabinet for goods storage and access being idle, controlling, according to a volume of each piece of goods placed on the fixed shelf, the moving member to adjust a position of the each piece of goods on the fixed shelf to maximize the space in the fixed shelf.

BRIEF DESCRIPTION OF THE DRAWINGS

Various other advantages and benefits will become clear to a person of ordinary skill in the art by reading the following detailed description of embodiments. The accompanying drawings are merely used for illustrating the embodiments and are not intended to constitute a limitation on this application. Throughout the accompanying drawings, the same reference numerals are used to represent the same components. In the accompanying drawings.

DETAILED DESCRIPTION

Figure 1:
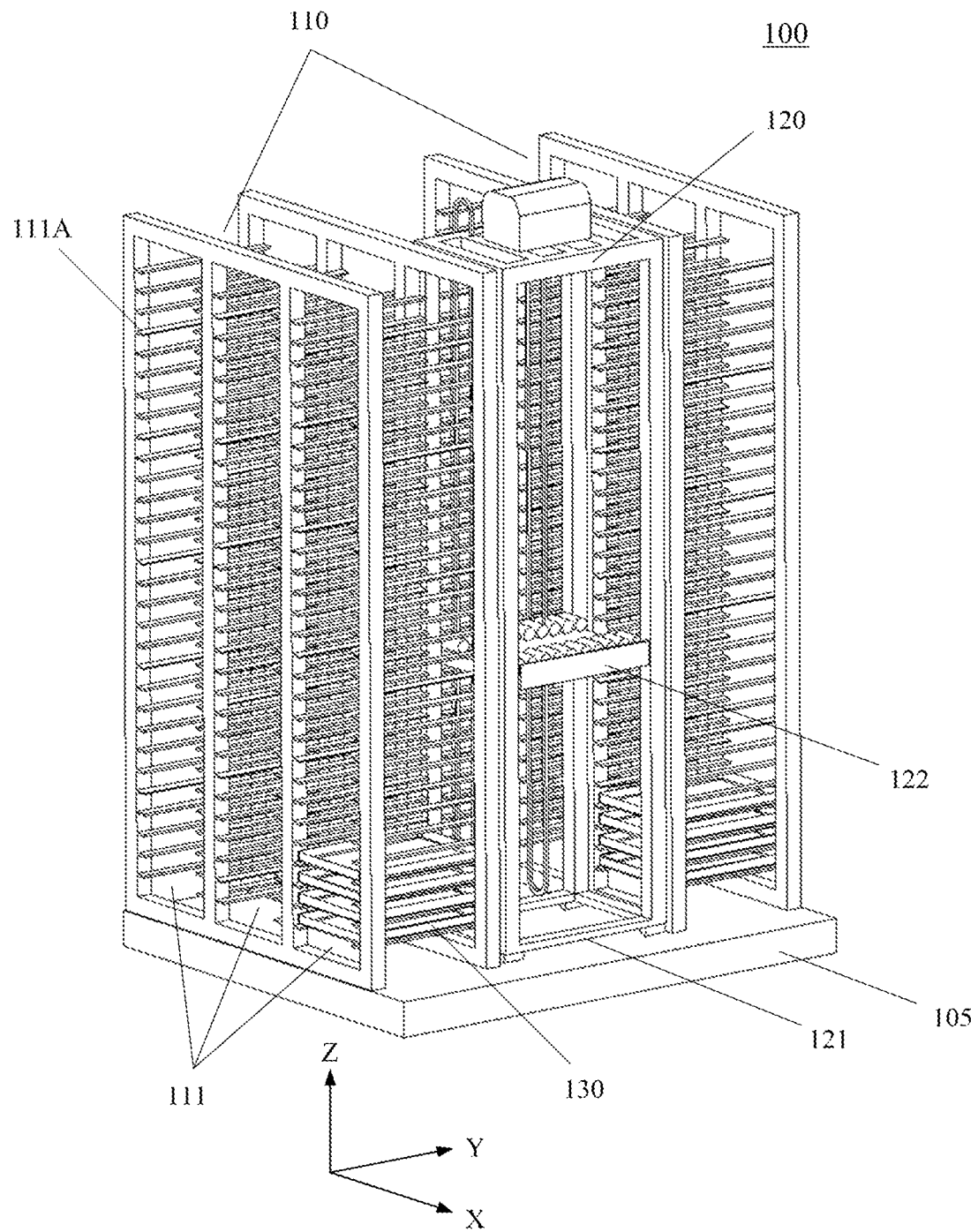
FIG. 1 is a perspective view of an internal structure of a cabinet for goods storage and access, according to an embodiment of this application.

The following describes embodiments of this application in detail with reference to the accompanying drawings. The following description is for illustrative purposes and is not intended to limit this application. In addition, in the following description, the same reference numerals will be used to represent the same or similar parts in different drawings. Different features in different embodiments described below may be combined with one another to form other embodiments falling within the scope of this application.

FIG. 1 is a perspective view of an internal structure of a cabinet for goods storage and access according to an embodiment of this application. As shown in FIG. 1, a cabinet for goods storage and access 100 includes at least one fixed shelf 110 and a moving member 120. The fixed shelf 110 is configured to store goods, and the moving member 120 is located on a side of the fixed shelf 110. In addition, the cabinet for goods storage and access 100 further includes a controller (not shown). The controller is configured to control the moving member 120 to move along the side of the fixed shelf 110 to a preset position on the fixed shelf 110. When to deliver goods to the cabinet for goods storage and access 100, the controller may control the moving member 120 to place the to-be-delivered goods on the fixed shelf 110 at the preset position. When to extract the goods from the cabinet for goods storage and access 100, the controller may control the moving member 120 to extract the goods from the fixed shelf 110 at the preset position.

According to different embodiments of this application, the controller may be disposed at any suitable position in the cabinet for goods storage and access 100, and the controller may send a control signal to the moving member 120 in a wired or wireless manner, so as to control the moving member 120.

In some embodiments, the controller may include one or more processors and one or more non-transitory computer-readable memories coupled to the one or more processors and configured with instructions executable by the one or more processors to cause the controller to perform the methods as described hereinafter.

Therefore, in the cabinet for goods storage and access provided in this application, the fixed shelf serves as a fixed part for storing goods, and the moving member serves as a movable part for placing and extracting goods, thereby achieving the self-help delivering and extracting of the goods. Moreover, placement of the goods on the shelf is more flexible, facilitating feasible and maximized utilization of space.

As shown in FIG. 1, the cabinet for goods storage and access 100 may include two fixed shelves 110. Sides of the two fixed shelves 110 are disposed opposite to each other and are separated by a distance, so that the moving member 120 can be located between the two fixed shelves 110. In this arrangement, the moving member 120 can move between the two fixed shelves 110 under control of the controller, that is, move along the sides of the two fixed shelves. According to this arrangement, the moving member 120 serves as a movable part of the cabinet for goods storage and access 100, which can place/extract goods for the shelves 110 on both sides of the moving member, improving space utilization rate and enabling the cabinet for goods storage and access to store more goods.

According to another embodiment, the two fixed shelves 110 may be disposed in an L-shape according to restrictions of site conditions. In this arrangement, the moving member 120 may also move along the sides of the two fixed shelves 110 under the control of the controller.

According to different embodiments of this application, the position and shape (for example, a zigzag shape or an S shape) of the fixed shelf may be properly set according to an actual situation of the site at which the cabinet for goods storage and access is to be installed, and regardless of whether to dispose a fixed shelf on one side or on two sides of the moving member, a fixed shelf on either side can be extended modularly (for example, a fixed shelf is disposed on the side on which no fixed shelf is disposed in the cabinet for goods storage and access, so that the fixed shelves can completely or partially surround the moving member), so as to form a cabinet for goods storage and access with a larger scale. In addition, although the two fixed shelves shown in FIG. 1 are symmetrical to each other, the fixed shelves on the two sides of the moving member may also be set to have different heights or lengths according to an actual situation of a site.

Still referring to FIG. 1, the cabinet for goods storage and access 100 may further include a base 105. Both the fixed shelf 110 and the moving member 120 may be disposed on the base 105.

Figure 2:
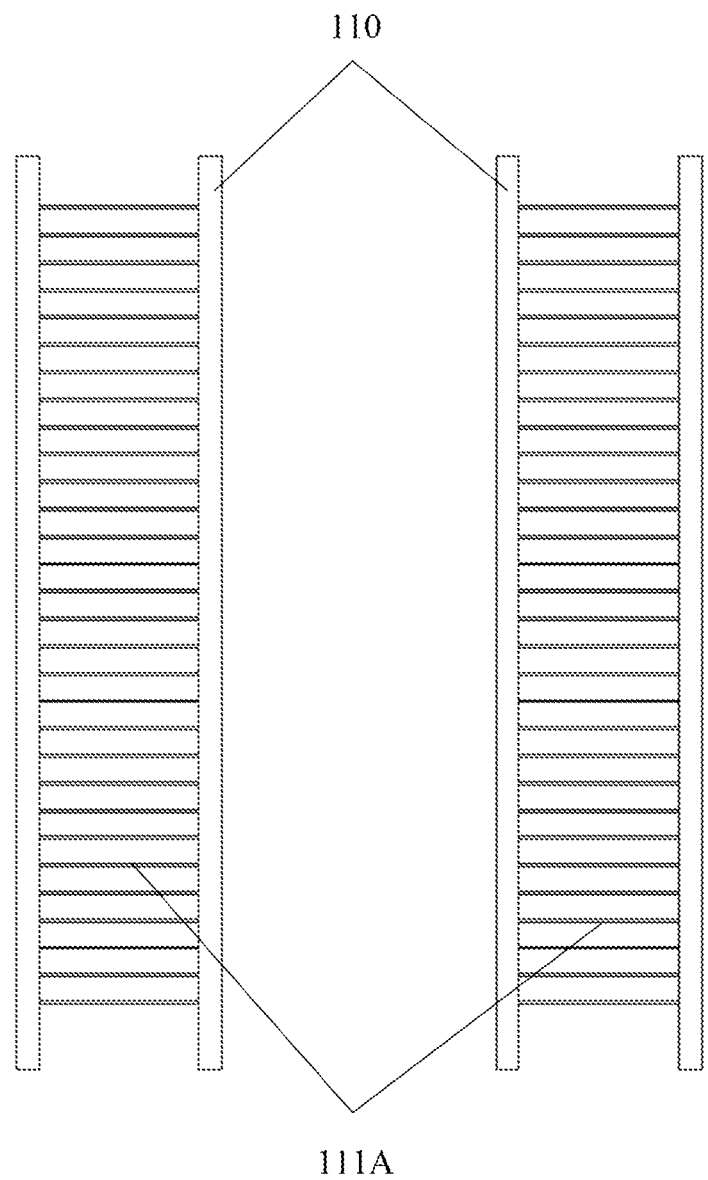
FIG. 2 is a view of a fixed shelf shown in FIG. 1 along a direction X shown in FIG. 1.
Figure 3:
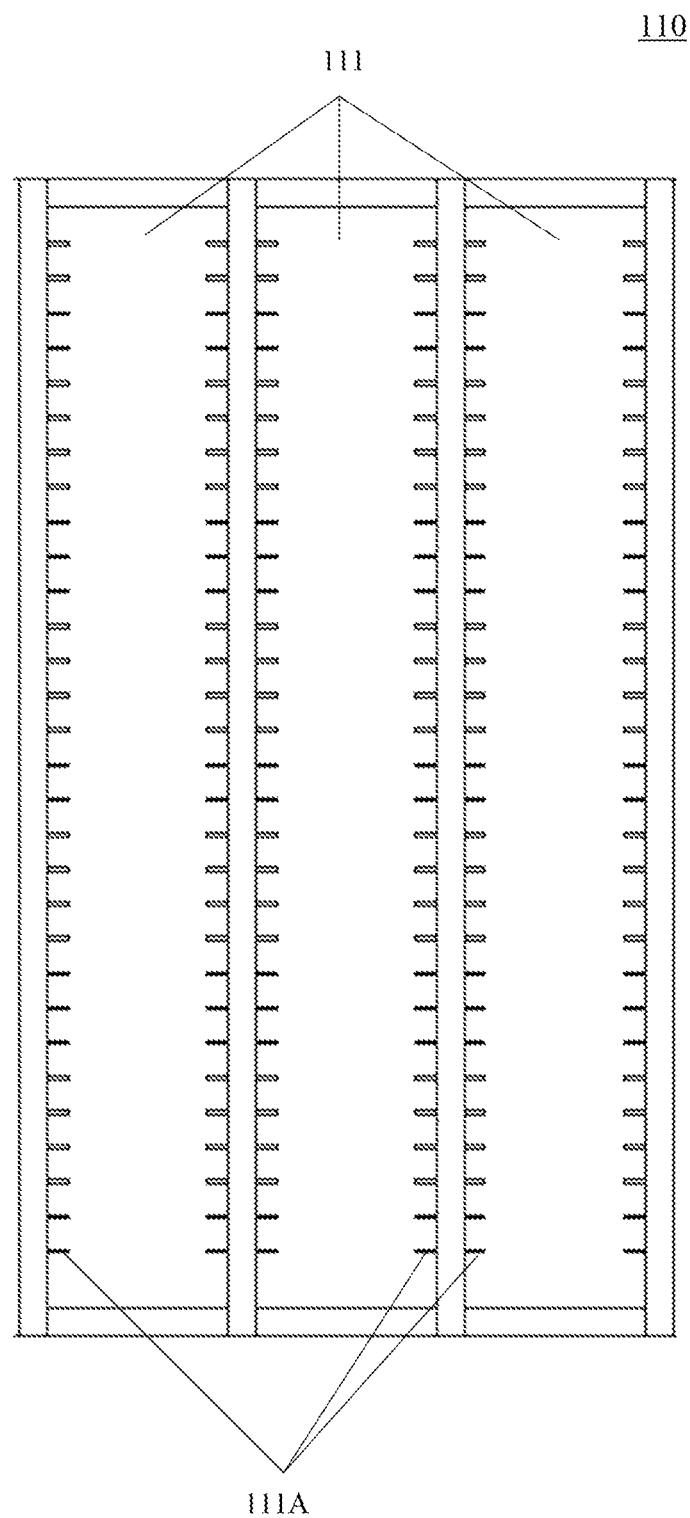
FIG. 3 is a view of the fixed shelf shown in FIG. 1 along a direction Y shown in FIG. 1.

FIG. 2 is a view of a fixed shelf shown in FIG. 1 along a direction X shown in FIG. 1. FIG. 3 is a view of the fixed shelf shown in FIG. 1 along a direction Y shown in FIG. 1. As shown in FIG. 1 to FIG. 3, each of the fixed shelves 110 may include a plurality of columns of carrying parts 111, and a plurality of goods may be arranged in the space of each column of carrying parts 111 along a vertical direction. Each column of carrying parts 111 have a plurality of supporting members 111A distributed along the vertical direction. The supporting member 111A is configured to support a carrying tray thereon (to be described later). Although the plurality of supporting members 111A shown in FIG. 1 to FIG. 3 are evenly distributed along the vertical direction, according to different embodiments of this application, the supporting members 111A may also be unevenly disposed to place goods of different volumes.

Figure 4:
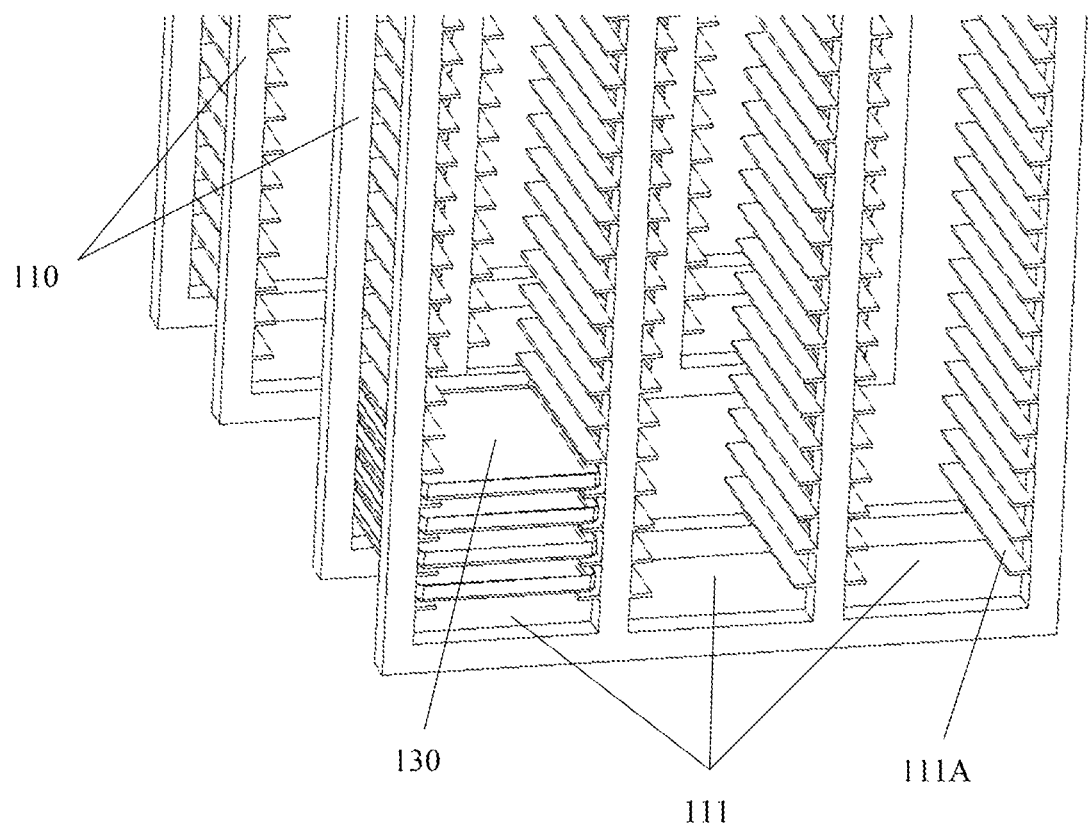
FIG. 4 is a perspective view of a plurality of carrying trays supported by a supporting member.

FIG. 4 is a perspective view of a plurality of carrying trays supported by a supporting member. As shown in FIG. 1 and FIG. 4, the cabinet for goods storage and access 100 further includes a plurality of carrying trays 130. The plurality of carrying trays 130 are respectively supported by the supporting members 111A. The carrying trays 130 shown in FIG. 1 and FIG. 4 may be initially supported by the supporting member 111A from the bottom. When a user is to deliver goods in a self-help manner, the moving member 120 may extract an empty carrying tray 130 from the supporting member 111A. After the user places the goods on the carrying tray 130 extracted by the moving member 120, the moving member 120 may place, at a proper position on the fixed shelf 110, the carrying tray 130 together with the goods carried on the carrying tray, that is, cause the carrying tray 130 to be supported by a supporting member 111A at a proper position. When the user is to is to extract goods in a self-help manner, the moving member 120 may extract, from the supporting member 111A, a carrying tray 130 on which target goods are carried, and move the carrying tray 130 to be close to the user. After the user takes the target goods on the carrying tray 130, the moving member 120 may move the empty carrying tray 130 back to the preset position on the fixed shelf, that is, cause the carrying tray 130 to be supported by a supporting member 111A at the preset position.

Figure 5:
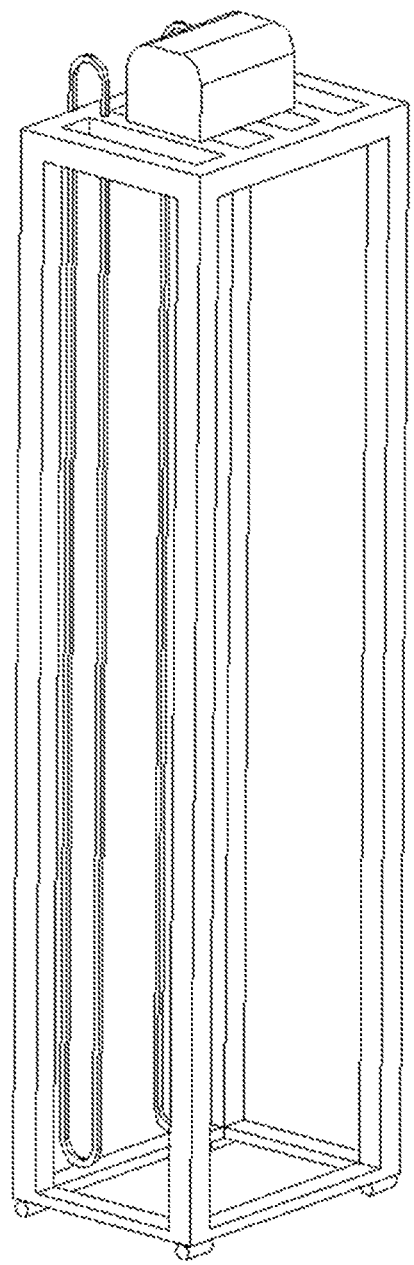
FIG. 5 is a perspective view of a moving frame, according to an embodiment of this application.

Still referring to FIG. 1, the moving member 120 may include a moving frame 121. FIG. 5 is a perspective view of a moving frame, according to an embodiment of this application. As shown in FIG. 1 and FIG. 5, the moving frame 121 may move in the horizontal direction (that is, the direction X shown in FIG. 1) along the side of the fixed shelf 110 under the control of the controller, to move to the side of a preset carrying part in the plurality of columns of carrying parts 111 of the fixed shelf 110.

When a user is to deliver goods in a self-help manner, the controller is configured to control the moving frame 121 to move in the direction X along the side of the fixed shelf 110 to the side of a preset carrying part (a carrying part with an empty carrying tray) in the plurality of columns of carrying parts 111. Subsequently, the moving member 120 extracts the empty carrying tray 130 from the preset carrying part. After the user places the goods on the carrying tray 130 extracted by the moving member 120, the controller is configured to control the moving frame 121 to move in the direction X along the side of the fixed shelf 110 to the side of some carrying part (a carrying part on which the goods are to be placed) in the plurality of columns of carrying parts 111. Subsequently, the moving member 120 places, at a proper position in the carrying part, the carrying tray 130 together with the goods carried on the carrying tray, that is, causes the carrying tray 130 to be supported by a supporting member 111A at the proper position in the carrying part.

When a user is to extract goods in a self-help manner, the controller is configured to control the moving frame 121 to move in the direction X along the side of the fixed shelf 110 to the side of a preset carrying part (a carrying part on which the target goods are placed) in the plurality of columns of carrying parts 111. Subsequently, the moving member 120 extracts, from the preset carrying part, a carrying tray 130 on which the target goods are placed. After the user extracts the target goods on the carrying tray 130, the controller is configured to control the moving frame 121 to move in the direction X along the side of the fixed shelf 110 to the side of some carrying part (a carrying part on which an empty carrying tray is to be placed) in the plurality of columns of carrying parts 111. Finally, the moving member 120 places the empty carrying tray 130 in the carrying part, that is, causes the carrying tray 130 to be supported by a supporting member 111A at the proper position in the carrying part.

According to different embodiments of this application, the moving frame 121 may move in the direction X by using travel rails, wheels, or transmission chains, etc.

Figure 6:
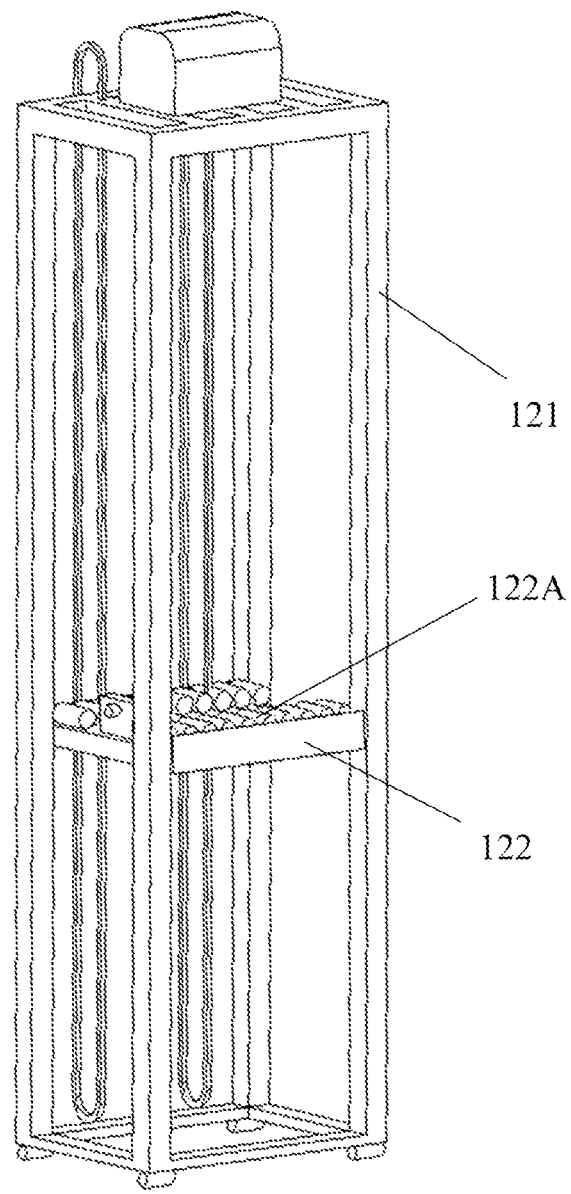
FIG. 6 is a perspective view of an assembly including a moving frame and a moving pallet, according to an embodiment of this application.

Still referring to FIG. 1, the moving member 120 may include a moving pallet 122. FIG. 6 is a perspective view of an assembly including a moving frame and a moving pallet, according to an embodiment of this application. As shown in FIG. 1 and FIG. 6, the moving pallet 122 may move in a vertical direction (that is, a direction Z shown in FIG. 1) along the moving frame 121 under the control of the controller, to move to a preset position on the fixed shelf 110.

When a user is to deliver goods in a self-help manner, the controller not only controls the moving frame 121 to move in the direction X along the side of the fixed shelf 110 to the side of a preset carrying part (a carrying part with an empty carrying tray) in the plurality of columns of carrying parts 111, but also controls the moving pallet 122 to move in the direction Z along the moving frame 121 to the preset position (a position with an empty carrying tray) on the fixed shelf 110. Subsequently, the moving member 120 extracts the empty carrying tray 130 from the preset position. After the user places the goods on the carrying tray 130 extracted by the moving member 120, the controller not only controls the moving frame 121 to move in the direction X along the side of the fixed shelf 110 to the side of some carrying part (a carrying part on which the goods are to be placed) in the plurality of columns of carrying parts 111, but also controls the moving pallet 122 to move in the direction Z along the moving frame 121 to some position (a position at which the goods are to be placed) on the fixed shelf 110. Subsequently, the moving member 120 places, at a proper position in the fixed shelf 110, the carrying tray 130 together with the goods carried on the carrying tray 130, that is, causes the carrying tray 130 to be supported by a supporting member 111A at the proper position in the fixed shelf.

When a user is to extract goods in a self-help manner, the controller not only controls the moving frame 121 to move in the direction X along the side of the fixed shelf 110 to the side of a preset carrying part (a carrying part on which the target goods are placed) in the plurality of columns of carrying parts 111, but also controls the moving pallet 122 to move in the direction Z along the moving frame 121 to a preset position (a position at which the target goods are placed) on the fixed shelf 110. Subsequently, the moving member 120 extracts, from the preset position, a carrying tray 130 on which the target goods are placed. After the user extracts the target goods on the carrying tray 130, the controller not only controls the moving frame 121 to move in the direction X along the side of the fixed shelf 110 to the side of some carrying part (a carrying part on which an empty carrying tray is to be placed) in the plurality of columns of carrying parts 111, but also controls the moving pallet 122 to move in the direction Z along the moving frame 121 to some position (a position at which the empty carrying tray is to be placed) on the fixed shelf 110. Finally, the moving member 120 places the empty carrying tray 130 at the position, that is, causes the carrying tray 130 to be supported by a supporting member 111A at the position.

According to different embodiments of this application, the moving pallet 122 may move in the moving frame 121 along the direction Z by using travel rails, wheels, or transmission chains, etc.

Figure 7:
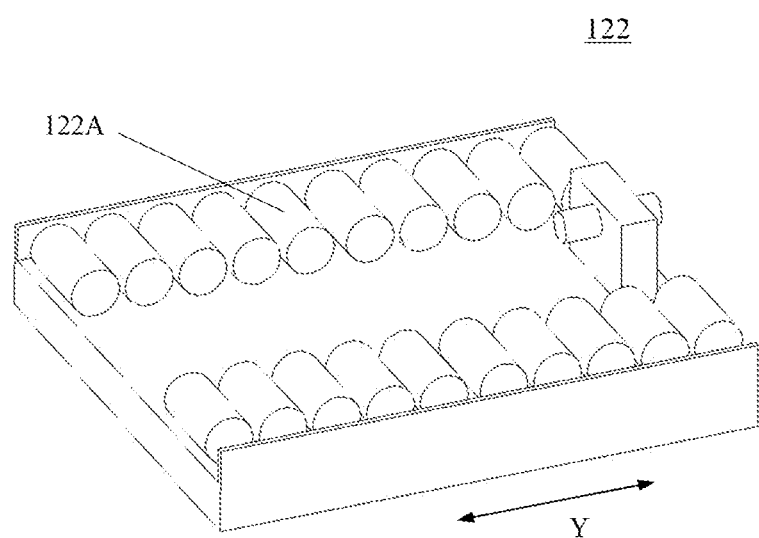
FIG. 7 is a perspective view of a moving pallet, according to an embodiment of this application.

Now referring to FIG. 6, the moving pallet 122 may have a horizontal conveyor 122A. FIG. 7 is a perspective view of a moving pallet, according to an embodiment of this application. As shown in FIG. 6 and FIG. 7, the horizontal conveyor 122A may convey, under the control of the controller, the carrying tray 130 on the supporting member 111A at the preset location along the horizontal direction (that is, the direction Y shown in FIG. 1) to the moving pallet 122. In addition, the horizontal conveyor 122A may further convey, under the control of the controller, the carrying tray 130 on the moving pallet 122 along the horizontal direction to the preset supporting member 111A.

When a user is to deliver goods in a self-help manner, after both the moving frame 121 and the moving pallet 122 move in place (that is, the moving pallet 122 has already been located at the empty carrying tray), the controller may control the horizontal conveyor 122A to convey the carrying tray 130 on the preset supporting member 111A along the direction Y to the moving pallet 122. After the user places the goods on the empty carrying tray 130 on the moving pallet 122 and both the moving frame 121 and the moving pallet 122 move in place (that is, the moving pallet 122 has already been located at a position at which the goods are to be placed), the controller may control the horizontal conveyor 122A to convey, to a corresponding supporting member 111A, the carrying tray 130 on the moving pallet 122 together with the goods on the carrying tray 130.

When a user is to extract goods in a self-help manner, after the moving frame 121 and the moving pallet 122 move in place (that is, the moving pallet 122 has already been located at the carrying tray on which the target goods are placed), the controller may control the horizontal conveyor 122A to convey the carrying tray 130 located on the preset supporting member 111A together with the target goods on the carrying tray 130 along the direction Y to the moving pallet 122. After the user extracts the target goods on the carrying tray 130 and both the moving frame 121 and the moving pallet 122 move in place (that is, the moving pallet 122 has already been located at a position at which the empty carrying tray 130 is to be placed), the controller may control the horizontal conveyor 122A to convey the empty carrying tray 130 on the moving pallet 122 along the direction Y to a corresponding supporting member 111A.

According to different embodiments of this application, the horizontal conveyor 122A may move the carrying tray 130 along forward and backward directions of Y (shown by arrows in FIG. 7) by using magnets, transmission rollers, transmission arms, vacuum suction cups, conveyor belts, or pushers, etc., so that the moving member 120 located between the two fixed shelves 110 can cooperate with the fixed shelves 110 on the two sides.

Accordingly, as a movable part, the moving member 120 can move the carrying tray 130 in the directions X, Y, and Z, thereby automatically delivering and extracting the goods.

Figure 8:
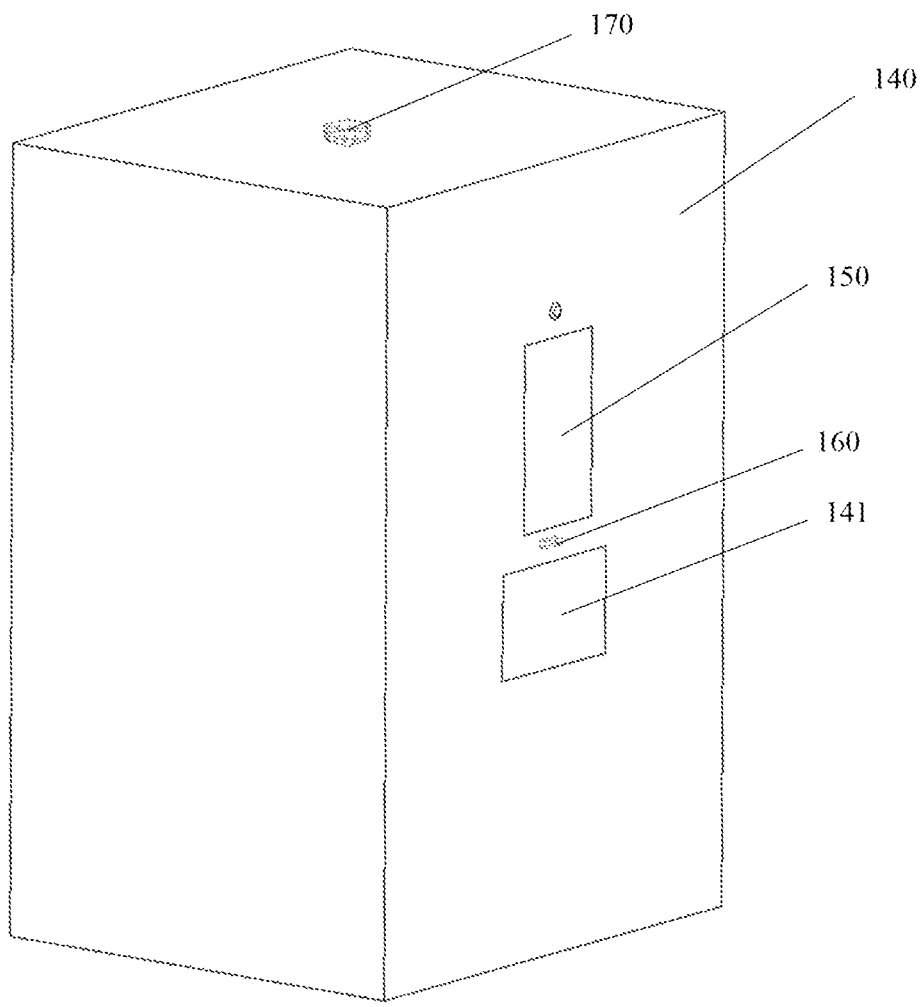
FIG. 8 is a schematic diagram of a cabinet body, according to an embodiment of this application.

According to an embodiment of this application, the cabinet for goods storage and access 100 may further include a cabinet body 140. FIG. 8 is a schematic diagram of a cabinet body, according to an embodiment of this application. As shown in FIG. 1 and FIG. 8, the cabinet body 140 surrounds the fixed shelf 110 and the moving member 120. According to the embodiment of this application, the cabinet body 140 may completely or partially surround the fixed shelf 110 and the moving member 120. When the cabinet body 140 partially surrounds the fixed shelf 110 and the moving member 120, the rest portions of the fixed shelf 110 and the moving member 120 may be surrounded by a wall at the site at which the cabinet for goods storage and access 100 is installed. A first slot 141 is disposed on the cabinet body 140. The first slot 141 is disposed adjacent to a moving track of the moving member 120 and is opened or closed under the control of the controller. In this way, the cabinet body can protect the parts and goods inside it, and a user can deliver or extract goods through the first slot.

According to an embodiment of this application, a height of the first slot 141 corresponds to the middle of the moving member 120 in the vertical direction (refer to FIG. 1 and FIG. 8). According to the above arrangement, an average moving distance of the moving pallet 122 in the moving member 120 between the first slot 141 and a target position on the shelf can be shortened, thereby improving operation efficiency and saving time for users.

Figure 9:
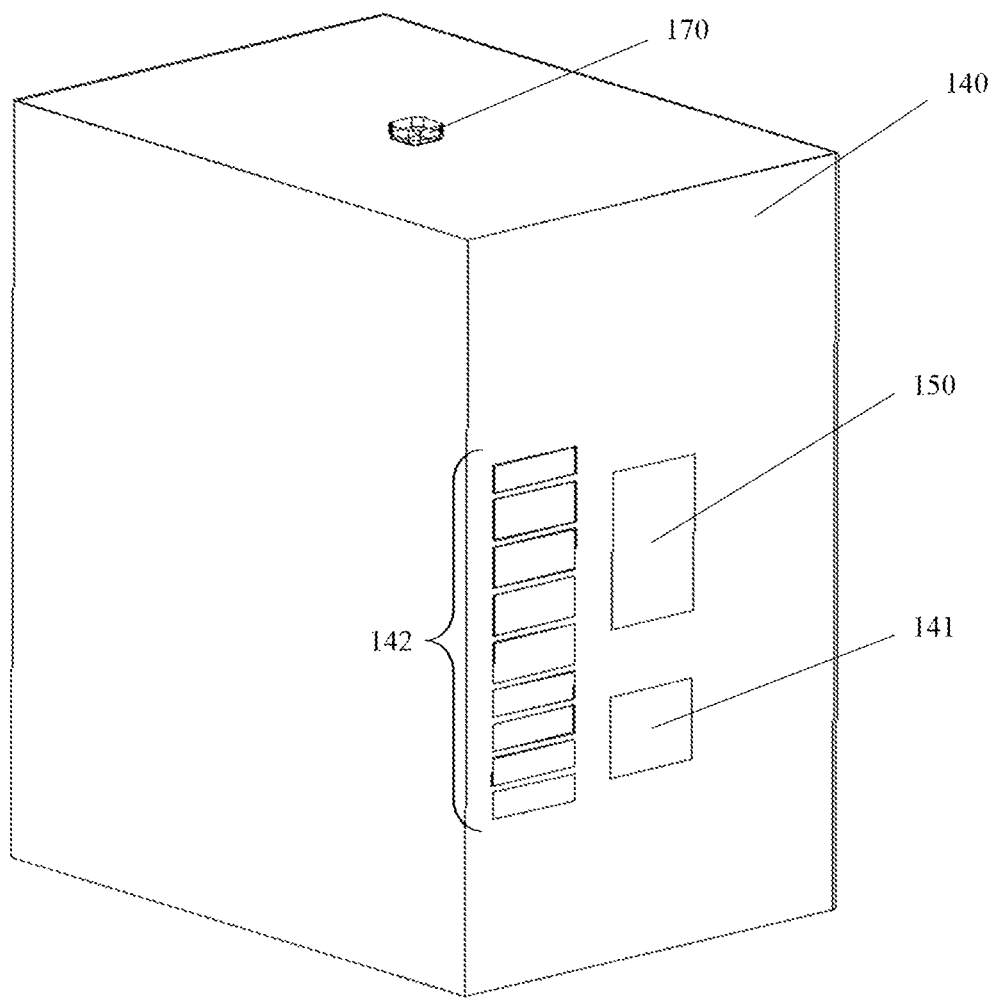
FIG. 9 is a schematic diagram of a cabinet body, according to another embodiment of this application.

FIG. 9 is a schematic diagram of a cabinet body, according to another embodiment of this application. As shown in FIG. 9, in addition to the first slot 141, a plurality of second slots 142 are further disposed on the cabinet body 140 for delivering goods in batches. Referring to FIG. 1 and FIG. 9, the plurality of second slots 142 are disposed adjacent to the fixed shelf 110. Therefore, when a user is to perform delivery in batches (for example, the user is to deliver a relatively large amount of goods, or logistics and distribution personnel is to deliver a plurality of goods of different users to the cabinet for goods storage and access), because the second slots 142 are directly adjacent to the fixed shelf 110 for placing goods, the user can directly place the goods on the fixed shelf 110 through the plurality of second slots 142 without relying on the moving member 120 to convey the goods to the fixed shelf 110, thereby saving operation time. In this situation, the controller may place an empty carrying tray at each of the second slots 142 in advance so that the user can place the goods. When no user uses the cabinet for goods storage and access (when the cabinet for goods storage and access is idle), the controller may control, according to volumes of the goods, the moving member 120 to adjust storage positions of the goods placed at the respective second slots.

Still referring to FIG. 8, the cabinet for goods storage and access 100 may further include an information input apparatus 150. The information input apparatus 150 is configured to obtain information input by a user and send the information to the controller. According to an embodiment, the information input apparatus 150 may include a touch screen or a keyboard, through which a user can input a delivery code or a takeout code as input information, so that the controller can establish a correspondence between the delivery code and to-be-delivered goods or find corresponding target goods according to the takeout code. According to an embodiment, the information input apparatus 150 may include a camera. The camera can scan a face image of a user or a Quick Response (QR) code presented by a user as input information, so that the controller can establish a correspondence between the input information and to-be-delivered goods or find corresponding target goods according to the input information. According to still another embodiment, the information input apparatus 150 may include a wireless receiving module. The wireless receiving module can establish a communication connection to a mobile terminal used by a user, so as to receive a delivery code or a takeout code from the mobile terminal of the user as input information, so that the controller can establish a correspondence between the delivery code and to-be-delivered goods or find corresponding target goods according to the takeout code. For example, identification information may be provided on the cabinet body 140 (such as a QR code on the cabinet body). A user may establish a communication connection to the wireless receiving module of the cabinet for goods storage and access by obtaining the identification information, so as to send input information to the wireless receiving module.

After the controller receives the information input by the user, in the event of delivering goods by the user, the controller may record a correspondence between the input information and the goods placed by the user in the cabinet body 140, and control the moving member 120 to convey, to the fixed shelf 110, the carrying tray 130 carrying the goods. In the event of extracting goods by the user, the controller may search for the goods corresponding to the input information, and control the moving member 120 to extract, from the fixed shelf 110, the carrying tray 130 carrying the goods.

According to an embodiment of this application, the cabinet for goods storage and access 100 may further include a scale (not shown). The scale may be disposed under the moving pallet 122 to weigh goods placed on the moving pallet 122 and send a weighing result to the controller. Therefore, goods to be delivered by a user may be weighed by using the scale to calculate corresponding fees. In some examples, before the goods are weighed, a weight of the moving pallet 122 and the carrying tray 130 for carrying goods may be subtracted from a reading of the scale in advance, to ensure accuracy of a weighing result of the scale.

According to another embodiment, the scale may be further disposed under a carrying tray 130 located at the first slot 141 to weigh goods placed on the carrying tray 130 and send a weighing result of the goods to the controller. After weighing, the moving member 120 may move the carrying tray 130 and the goods on the carrying tray to the moving pallet 122.

Still referring to FIG. 8, the cabinet for goods storage and access 100 may further include a volume recognizer 160. The volume recognizer 160 is disposed adjacent to the first slot 141 to recognize the volume of goods entering the first slot 141. Subsequently, the controller may control, according to a recognition result of the volume recognizer 160, the moving member 120 to place the goods on the fixed shelf 110. Therefore, the controller may select, according to the volume of the goods recognized by the volume recognizer, a suitable space on the fixed shelf 110 for placing the goods, and control the moving member to convey the goods to the selected position. The "volume" herein may be a size, a height, or other parameters that can represent the size of the goods. A volume recognizer refers to a device for recognizing the volume or size of an object. For example, a volume recognizer may be a sensor for detecting the size of an object.

According to an embodiment of this application, the controller may select a shortest path according to the recognition result of the volume recognizer 160, and control the moving member 120 to place, according to the selected shortest path, the goods on the fixed shelf 110. In order to shorten the moving time of the moving member 120 and improve processing efficiency, the controller may select, according to the size of the goods as well as empty positions and the sizes of the empty positions on the fixed shelf 110, a closest position (that is, a shortest path for the moving member 120 to move) with a space that can accommodate the goods, and control the moving member 120 to convey the goods to the closest position along the shortest path.

According to an embodiment of this application, the controller may control, according to the volume of each piece of goods placed on the fixed shelf 110, the moving member 120 to adjust the position of the each piece of goods on the fixed shelf 110. When the cabinet for goods storage and access 100 is idle, the controller may optimize the positions of goods placed in the fixed shelf 110, that is, adjust the storage positions of the goods according to the volume of each piece of goods.

Figure 10:
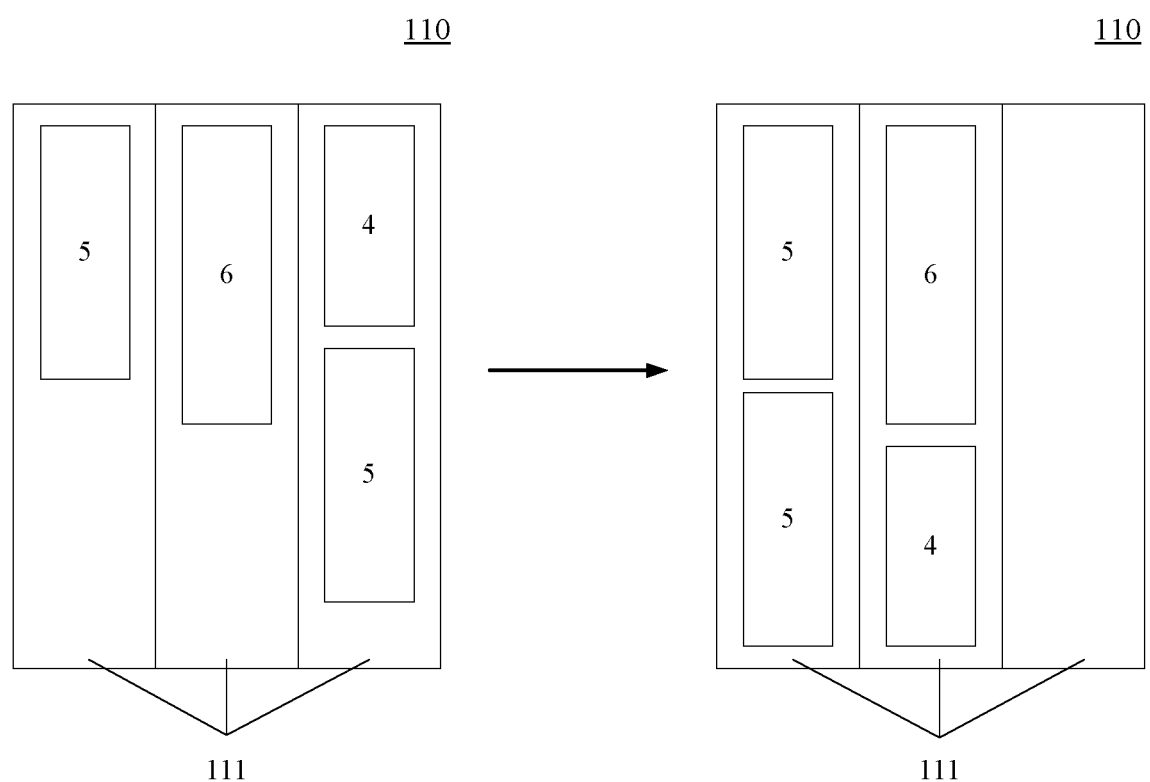
FIG. 10 schematically shows an example of optimizing storage positions of goods by a controller.

FIG. 10 schematically shows an example of optimizing storage positions of goods by a controller. As shown in a left side of FIG. 10, the fixed shelf 110 includes three columns of carrying parts 111. It is assumed that the height of each column of carrying parts 111 is 10, there are a total of four pieces of goods placed on the fixed shelf 110, and the heights of the goods are as follows: the height of a piece of goods placed in a left column of carrying parts 111 is 5, the height of a piece of goods placed in a middle column of carrying parts 111 is 6, and the heights of two pieces of goods placed in a right column of carrying parts 111 are respectively 4 and 5. After optimization performed by the controller, the goods may be placed in a manner shown in a right side of FIG. 10 through the moving member 120. The two pieces of goods with the height of 5 are placed in the left column of carrying parts 111, the two pieces of goods with the respective heights of 6 and 4 are placed in the middle column of carrying parts 111, and the right column of carrying parts 111 are empty. In this way, the space in the fixed shelf 110 can be maximized, and the right column of carrying parts 111 can be adapted to place more goods.

Still referring to FIG. 8, the cabinet for goods storage and access 100 may further include a live body detector 170. The live body detector 170 may be disposed adjacent to the first slot 141 or disposed on the top of the cabinet body 140 to detect a live body entering the first slot 141 and send a detection result to the controller. When a user delivers or extracts goods by using the cabinet for goods storage and access, living bodies such as animals (such as flying birds) may enter the cabinet for goods storage and access through the slot. In order to avoid accidents or failures inside the cabinet for goods storage and access, the live body detector 170 may perform monitoring and report a monitoring result to the controller in time. After receiving the monitoring report of the live body detector 170, the controller may take measures such as issuing an alarm to prompt the user or device maintenance personnel.

According to an embodiment of this application, the fixed shelf 110 and the moving member 120 may be partially or completely buried underground or embedded in a wall. In this way, the cabinet for goods storage and access can be designed and installed more flexibly according to different site situations.

Figure 11:
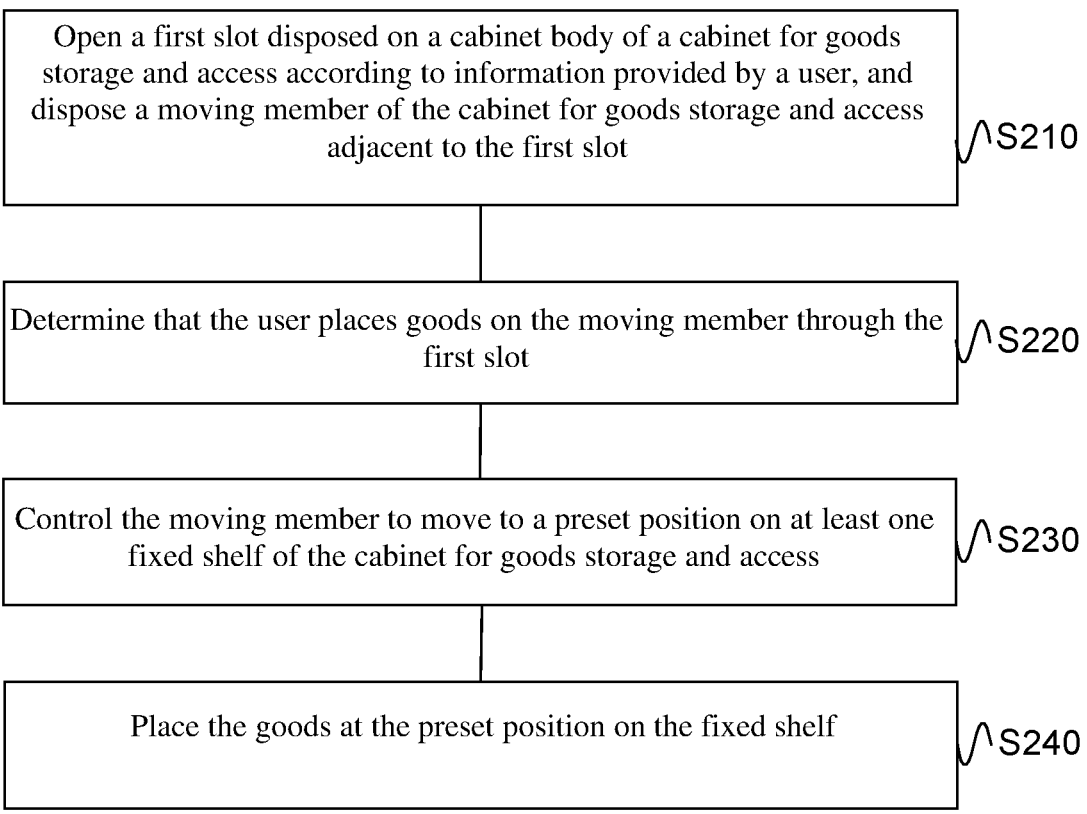
FIG. 11 is a flowchart of a method for collecting goods by using a cabinet for goods storage and access, according to an embodiment of this application.

FIG. 11 is a flowchart of a method for collecting goods by using a cabinet for goods storage and access, according to an embodiment of this application. As shown in FIG. 11, the method 200 may include steps S210 to S240. In step S210, a first slot disposed on a cabinet body of the cabinet for goods storage and access is opened according to information provided by a user, and a moving member of the cabinet for goods storage and access is disposed adjacent to the first slot. In step S220, it is determined that the user places the goods on the moving member through the first slot. In step S230, the moving member is controlled to move to a preset position on at least one fixed shelf of the cabinet for goods storage and access. In step S240, the goods are placed at the preset position on the fixed shelf.

According to an embodiment of this application, the at least one fixed shelf includes two fixed shelves with sides disposed opposite to each other, where the moving member is located between the two fixed shelves.

According to another embodiment of this application, the at least one fixed shelf includes two fixed shelves disposed in an L shape, and step S230 includes: controlling the moving member to move along sides of the two fixed shelves.

According to an embodiment of this application, each of the fixed shelves includes a plurality of columns of carrying parts, where each column of carrying parts have a plurality of supporting members distributed along a vertical direction, the cabinet for goods storage and access further includes a plurality of carrying trays respectively supported by the plurality of supporting members, and step S230 includes: controlling a moving frame of the moving member to move in a horizontal direction along the side of the fixed shelf to the side of a preset carrying part in the plurality of columns of carrying parts of the fixed shelf. Further, step S230 may further include: controlling a moving pallet of the moving member to move in a vertical direction along the moving frame to the preset position on the fixed shelf. Furthermore, the moving pallet has a horizontal conveyor, and step S240 may include: controlling the horizontal conveyor to convey, to a preset supporting member along a horizontal direction, a carrying tray on the moving pallet and the goods carried on the carrying tray.

According to an embodiment of this application, a height of the first slot corresponds to the middle of the moving member in the vertical direction.

According to an embodiment of this application, the above method for collecting goods by using a cabinet for goods storage and access may further include: recording a correspondence between the information provided by the user and the goods.

According to an embodiment of this application, the above method for collecting goods by using a cabinet for goods storage and access may further include: weighing the goods.

According to an embodiment of this application, the above method for collecting goods by using a cabinet for goods storage and access may further include: recognizing a volume of the goods, and determining, according to a recognized volume, a position at which the goods are to be placed. Further, a shortest path may be selected according to the recognized volume to determine the position at which the goods are to be placed on the fixed shelf.

According to an embodiment of this application, the above method for collecting goods by using a cabinet for goods storage and access may further include: detecting a live body entering the first slot.

According to an embodiment of this application, the cabinet for goods storage and access is partially or completely buried underground or embedded in a wall.

Figure 12:
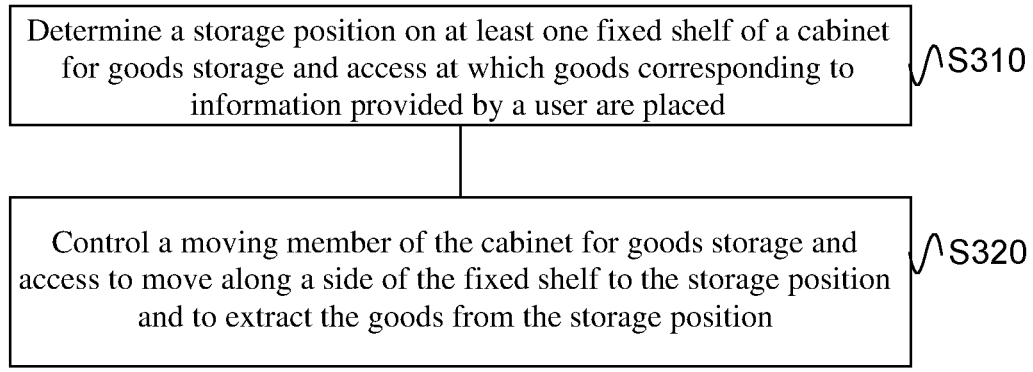
FIG. 12 is a flowchart of a method for distributing goods from a cabinet for goods storage and access, according to an embodiment of this application.

FIG. 12 is a flowchart of a method for distributing goods from a cabinet for goods storage and access, according to an embodiment of this application. As shown in FIG. 12, the method 300 may include steps S310 and S320. In step S310, a storage position on at least one fixed shelf of the cabinet for goods storage and access is determined at which goods corresponding to information provided by a user are placed. In step S320, a moving member of the cabinet for goods storage and access is controlled to move along a side of the fixed shelf to the storage position and to extract the goods from the storage position.

According to an embodiment of this application, the at least one fixed shelf includes two fixed shelves with sides disposed opposite to each other, where the moving member is located between the two fixed shelves.

According to another embodiment of this application, the at least one fixed shelf includes two fixed shelves disposed in an L shape, and step S320 may include: controlling the moving member to move along sides of the two fixed shelves.

According to an embodiment of this application, each of the fixed shelves includes a plurality of columns of carrying parts, where each column of carrying parts have a plurality of supporting members distributed along a vertical direction, the cabinet for goods storage and access further includes a plurality of carrying trays respectively supported by the plurality of supporting members, and step S320 may include: controlling a moving frame of the moving member to move in a horizontal direction along the side of the fixed shelf to the side of a preset carrying part in the plurality of columns of carrying parts of the fixed shelf. Further, step S320 may further include: controlling a moving pallet of the moving member to move in a vertical direction along the moving frame to the storage position. Furthermore, the moving pallet has a horizontal conveyor, and step S320 may further include: controlling the horizontal conveyor to convey a carrying tray on the supporting member at the storage position to the moving pallet along a horizontal direction.

According to an embodiment of this application, a first slot is disposed on a cabinet body of the cabinet for goods storage and access, and the method 300 for distributing goods from a cabinet for goods storage and access may further include: controlling the moving pallet to convey the extracted goods to the first slot. Further, a height of the first slot corresponds to the middle of the moving member in the vertical direction.

According to an embodiment of this application, the cabinet for goods storage and access is partially or completely buried underground or embedded in a wall.

A person skilled in the art may understand that the technical solutions in this application may be implemented as a system, a method, or a computer program product. Therefore, this application may be embodied in the form of hardware only embodiments, software only embodiments (including firmware, resident software, microcode, and the like), or embodiments with a combination of software and hardware, which may generally be referred to as a "circuit," "module," or "system." In addition, this application may take the form of a computer program product embodied in any tangible medium of expression having computer-usable program code stored therein.

This application is described with reference to the flowcharts and/or block diagrams of the method, apparatus (system), and computer program product according to the embodiments of this application. It can be understood that each block of the flowcharts and/or block diagrams and combinations of blocks in the flowcharts and/or block diagrams can be implemented by computer program instructions. These computer program instructions can be provided to a processor of a general-purpose computer, special-purpose computer, or other programmable data processing device, such that the instructions, which execute via the processor of the computer or other programmable data processing device, create means for implementing the functions/acts specified in one or more blocks of the flowcharts and/or block diagrams.

These computer program instructions may also be stored in a computer-readable medium that can direct a computer or other programmable data processing device to function in a particular manner, such that the instructions stored in the computer-readable medium produce an apparatus including instruction means which implement the functions/acts specified in one or more blocks of the flowcharts and/or block diagrams.

The computer program instructions may also be loaded onto a computer or other programmable data processing device to cause a series of operational steps to be performed on the computer or other programmable device to produce a computer implemented process such that the instructions which execute on the computer or other programmable device provide processes for implementing the functions/acts specified in one or more blocks of the flowcharts and/or block diagrams.

The flowcharts and block diagrams in the accompanying drawings illustrate the architectures, functionalities, and operations of possible embodiments of systems, methods and computer program products according to various embodiments of this application. In this regard, each block in the flowcharts or block diagrams may represent a module, segment, or part of code, which includes one or more executable instructions for implementing the specified logical function(s). It is also to be noted that in some alternative embodiments, the functions noted in the block may not occur in the order noted in the accompanying drawings. For example, two successively-shown blocks may, in fact, be executed substantially concurrently, or the blocks may sometimes be executed in the reverse order, depending upon the functionalities involved. It is also to be noted that each block of the block diagrams and/or flowchart illustrations, and combinations of blocks in the block diagrams and/or flowchart illustrations, can be implemented by special-purpose hardware-based systems that perform the specified functions or acts, or combinations of special-purpose hardware and computer instructions.

Although the foregoing descriptions include many arrangements and parameters, it is to be noted that such arrangements and parameters are merely used for illustrating an embodiment of this application, and are not construed as limiting the scope of this application. A person skilled in the art can understand that various modifications, additions, and replacements can be made without departing from the scope and spirit of this application. Therefore, the scope of this application should be interpreted via the appended claims.

What is claimed is:

1. A cabinet for goods storage and access, comprising:
   at least one fixed shelf configured to store goods;
   a moving member located on a side of the fixed shelf;
   a controller configured to control the moving member to move along the side of the fixed shelf to place goods in the fixed shelf or extract goods from the fixed shelf;
   a cabinet body surrounding the fixed shelf and the moving member, wherein a first slot is disposed on the cabinet body and adjacent to a moving track of the moving member, wherein the controller is configured to control the first slot to be opened or closed; and
   a volume recognizer disposed adjacent to the first slot to recognize a volume of goods entering the first slot,
   wherein the controller is configured to control, according to the recognized volume, the moving member to move to a position on the at least one fixed shelf to place the goods on the fixed shelf, and
   wherein the controller is further configured to control, in response to the cabinet for goods storage and access being idle, the moving member to adjust a position of each piece of goods on the fixed shelf to maximize the space in the fixed shelf according to a volume of the each piece of goods placed on the fixed shelf.

2. The cabinet for goods storage and access according to claim 1, wherein the at least one fixed shelf comprises two fixed shelves with sides disposed opposite to each other, wherein the moving member is located between the two fixed shelves.

3. The cabinet for goods storage and access according to claim 2, wherein the fixed shelves completely or partially surround the moving member.

4. The cabinet for goods storage and access according to claim 1, wherein the at least one fixed shelf comprises two fixed shelves disposed in an L shape, wherein the moving member moves along sides of the two fixed shelves under control of the controller.

5. The cabinet for goods storage and access according to claim 1, wherein each of the at least one fixed shelf comprises a plurality of columns of carrying parts, wherein each column of carrying parts have a plurality of supporting members distributed along a vertical direction, and the cabinet for goods storage and access further comprises:
a plurality of carrying trays respectively supported by the plurality of supporting members.

6. The cabinet for goods storage and access according to claim 5, wherein the moving member comprises a moving frame moving in a horizontal direction along the side of the fixed shelf under the control of the controller, to move to the side of a preset carrying part in the plurality of columns of carrying parts of the fixed shelf.

7. The cabinet for goods storage and access according to claim 6, wherein the moving member further comprises a moving pallet moving in a vertical direction along the moving frame under the control of the controller, to move to the position on the fixed shelf.

8. The cabinet for goods storage and access according to claim 7, wherein the moving pallet has a horizontal conveyor configured to convey, under the control of the controller, a carrying tray located on a preset supporting member to the moving pallet along a horizontal direction or a carrying tray on the moving pallet to the preset supporting member along the horizontal direction.

9. The cabinet for goods storage and access according to claim 5, further comprising:
an information input apparatus configured to obtain information input by a user and send the information to the controller, wherein
the controller is further configured to:
record a correspondence between the information and goods, and control the moving member to convey, to the supporting member, a carrying tray carrying the goods corresponding to the information; or
search for the goods corresponding to the information, and control the moving member to extract, from the fixed shelf, the carrying tray carrying the goods corresponding to the information.

10. The cabinet for goods storage and access according to claim 1, wherein a height of the first slot corresponds to the middle of the moving member in the vertical direction.

11. The cabinet for goods storage and access according to claim 1, wherein a plurality second slots are further disposed on the cabinet body, wherein the plurality second slots are disposed adjacent to the fixed shelf.

12. The cabinet for goods storage and access according to claim 1, further comprising:
a scale disposed under a moving pallet to weigh goods placed on the moving pallet and send a weighing result to the controller; or
a scale disposed under a carrying tray located at the first slot to weigh goods placed on the carrying tray and send a weighing result to the controller.

13. The cabinet for goods storage and access according to claim 1, wherein the controller is further configured to select a shortest path according to the recognition result of the volume recognizer, and control the moving member to place the goods on the fixed shelf according to the shortest path.

14. The cabinet for goods storage and access according to claim 1, further comprising:
a live body detector disposed adjacent to the first slot to detect a live body entering the first slot and send a detection result to the controller.

15. The cabinet for goods storage and access according to claim 1, wherein the fixed shelf and the moving member are partially or completely buried underground or embedded in a wall.

16. A method for collecting goods by using a cabinet for goods storage and access, comprising:
opening, according to information provided by a user, a first slot disposed on a cabinet body of the cabinet for goods storage and access, and causing a moving member of the cabinet for goods storage and access to be adjacent to the first slot for the user to place goods on the moving member through the first slot;
recognizing a volume of the goods;
determining, according to the recognized volume, a position at which the goods are to be placed on at least one fixed shelf of the cabinet for goods storage and access;
controlling the moving member to move to the position on the at least one fixed shelf of the cabinet for goods storage and access to place the goods at the position on the fixed shelf; and
in response to the cabinet for goods storage and access being idle, controlling, according to a volume of each piece of goods placed on the fixed shelf, the moving member to adjust a position of the each piece of goods on the fixed shelf to maximize the space in the fixed shelf.

17. The method according to claim 16, further comprising:
weighing the goods.

18. The method according to claim 16, wherein determining, according to a recognized volume, a position at which the goods are to be placed on at least one fixed shelf of the cabinet for goods storage and access comprises:
selecting a shortest path according to the recognized volume to determine the position at which the goods are to be placed on the fixed shelf.

19. The method according to claim 16, further comprising:
detecting a live body entering the first slot.

20. A controller for collecting goods from a user, disposed in a cabinet for goods storage and access, the controller comprises: one or more processors and one or more non-transitory computer-readable memories coupled to the one or more processors and configured with instructions executable by the one or more processors to cause the controller to perform operations comprising:
opening, according to information provided by a user, a first slot disposed on a cabinet body of the cabinet for goods storage and access, and causing a moving member of the cabinet for goods storage and access to be adjacent to the first slot for the user to place goods on the moving member through the first slot;
receiving a volume of the goods recognized by a volume recognizer; determining, according to the volume, a position at which the goods are to be placed on at least one fixed shelf of the cabinet for goods storage and access;

controlling the moving member to move to the position on the at least one fixed shelf of the cabinet for goods storage and access to place the goods at the position on the fixed shelf; and in response to the cabinet for goods storage and access being idle, controlling, according to a volume of each piece of goods placed on the fixed shelf, the moving member to adjust a position of the each piece of goods on the fixed shelf to maximize the space in the fixed shelf.

\* \* \* \* \*